United States Patent [19]

Gustafson

[11] Patent Number: 5,717,574
[45] Date of Patent: Feb. 10, 1998

[54] SIGNAL INDICATING ELECTRICAL COMPONENT BOX

[76] Inventor: Lars Gustafson, Övre Furuskogsvägen 4, S-433 41 Partille, Sweden

[21] Appl. No.: 537,847

[22] PCT Filed: Mar. 31, 1994

[86] PCT No.: PCT/SE94/00292

§ 371 Date: Jan. 22, 1996

§ 102(e) Date: Jan. 22, 1996

[87] PCT Pub. No.: WO94/24738

PCT Pub. Date: Oct. 27, 1994

[30] Foreign Application Priority Data

Apr. 20, 1993 [SE] Sweden ................................ 9301287

[51] Int. Cl.[6] ........................................................ H05K 5/00
[52] U.S. Cl. ............................. 361/752; 361/633; 362/362
[58] Field of Search ............................... 116/305, 307; 200/292, 293, 296, 308, 333; 324/156, 157; 361/600, 632, 633, 643, 647, 651, 679, 682, 681, 724, 725, 727, 728, 736, 752, 807, 809, 828, 817, 815; 362/154, 155, 158, 184, 191, 362, 365, 368, 375, 367; 174/35 R, 35 GC, 50.5, 50.51

[56] References Cited

U.S. PATENT DOCUMENTS 4,262,181  4/1981  Tufano et al. ............................ 200/296

FOREIGN PATENT DOCUMENTS 3526525  2/1986  Germany.

*Primary Examiner*—Donald Sparks
*Attorney, Agent, or Firm*—Cushman Darby & Cushman Intellectual Property Group of Pillsbury Madison & Sutro LLP

[57] ABSTRACT

A signal indicating device mounted on the wall of a cover box or the like. The box encloses electrical components such as contactors, relays and other devices for registration of e.g. the operational conditions of an industrial process. A printed circuit indicating or control card is connected between the electrical components and the signal indicating device. The signal indicating device comprises at least one row of signalling lamps mounted on a printed circuit card, which is hermetically enclosed in a case with the signalling lamps projecting through holes formed in one of the sides of the case. Also mounted on the printed-circuit card are plugs passing through one side of the case so as to project externally thereof and arranged to be connected with corresponding plugs on the printed circuit indicating or control card via an opening formed in the wall of the cover box. The case is arranged to exert a compressing force on a sealing gasket mounted about the opening in the wall, in the interconnected position of the plugs.

4 Claims, 4 Drawing Sheets

SIGNAL INDICATING ELECTRICAL COMPONENT BOX

This application claims benefit of international application PCT/SE94/00292 filed Mar. 31, 1994.

BACKGROUND OF THE INVENTION

The subject invention concerns a signal indicating device which is mounted on the wall of a cover box or the like enclosing electric components such as contactors relays, and the like.

For the operation of various industrial processes and the control of the operational function of various types of means such as pumps, fans and the like, signal indicating means are required. In the case of contactors, relays, and switches it is necessary to indicate the positions of contact, which are displayed with the aid of signalling or indicator lamps on a control panel. These components are enclosed in the cover box and the signalling or indicator lamps are mounted on the box front which serves as a control-panel front.

In accordance with prior-art techniques a number of rows of holes are made in the panel front wall of the box and the signalling or indicator lamps, which may be, e.g. of LED type, are mounted in the holes. Wiring connects each lamp to its associated electric component inside the box.

To form a panel of signalling or indicator lamps in the wall of the cover box in the manner indicated is a comparatively complex operation. The drilling of rows of round holes or the sawing of square or rectangular apertures, the mounting of a lamp in each hole or aperture and the subsequent electric connection of each lamp with its associated component are time-consuming operations with consequential comparatively high panel-production costs. Installations in polluted or humid environments require separate enclosures with special seals and gaskets, which delays and makes the work still more difficult.

SUMMARY OF THE INVENTION

The subject invention provides a signal indicating device which may be mounted on a cover box in a highly simplified manner. The signal indicating device is a pre-assembled unit which may be attached to a cover box in connection with the mounting while at the same time an efficient sealing effect with respect to the box is achieved through simple means.

BRIEF DESCRIPTION OF THE DRAWINGS

The invention will be described in closer detail in the following with reference to the accompanying drawings, wherein.

DETAILED DESCRIPTION

Figure 1:
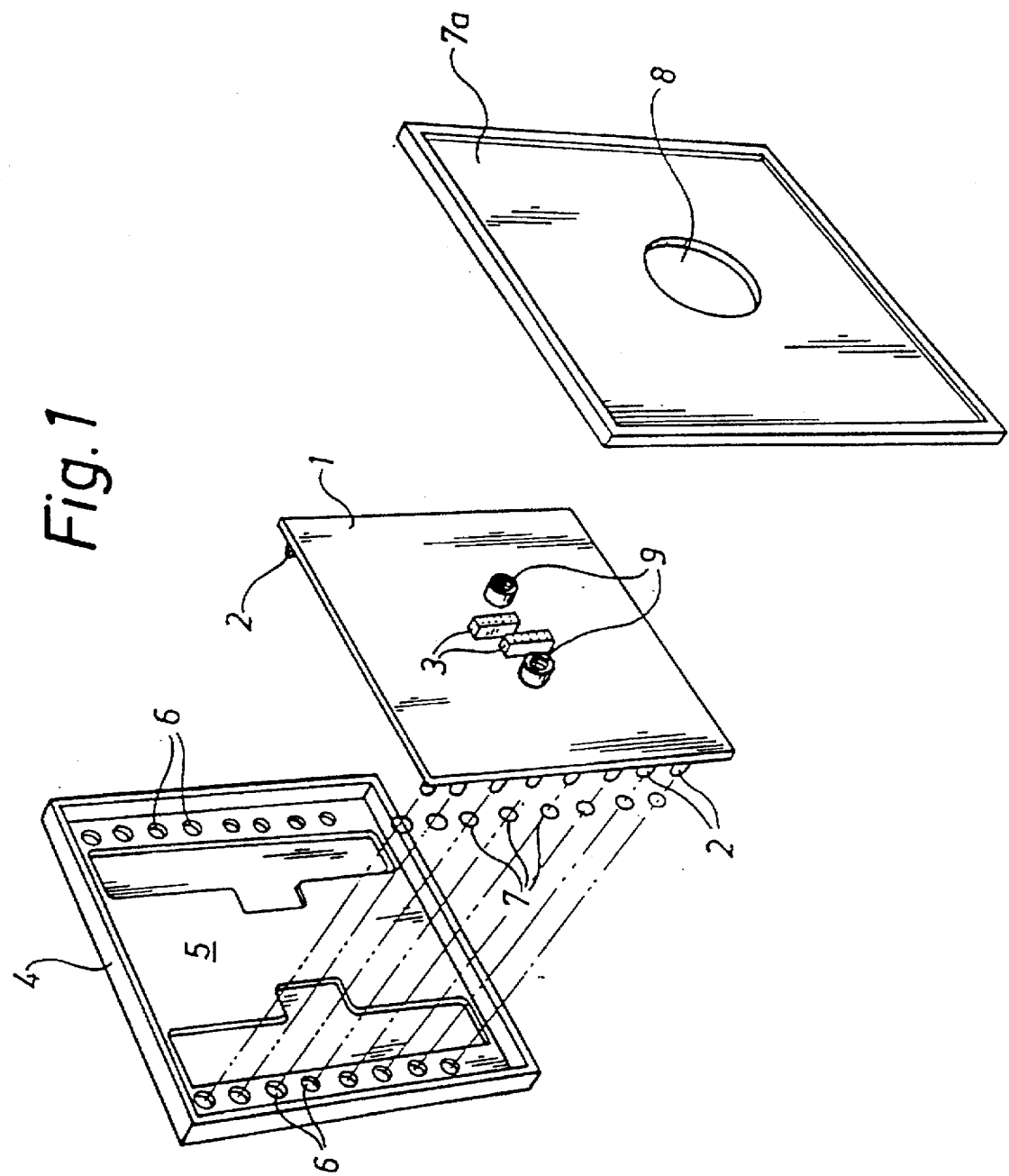
FIG. 1 is an exploded perspective view of the signal indicating device.

The device comprises a printed circuit card 1 on which rows of signalling lamps 2, preferably LEDs, are mounted as is also a pair of plugs 3, the latter being arranged on the side of the card 1 opposite to that on which the lamps 2 are mounted. The card 1 is placed inside a case 4 the front wall 5 of which is provided with a couple of rows of holes 6. In the mounting of the printed circuit card 1, the signalling or indicator lamps 2 are pushed through their associated one of the holes 6 so as to project beyond the external face of the wall 5. O-rings 7 applied about each lamp 2 seal against the inner face of the wall 5. A rear wall 7a of the case 4 hermetically encloses the card 1 inside the case 4. A central opening 8 formed in the rear wall 7a allows the plugs 3 and a couple of threaded sleeves 9, mounted on the printed circuit card 1, to project through and beyond the backing 7a. When the assembly is thus completed the opening 8 is sealed, e.g. by means of a solidifying type of sealing compound.

Figure 2:
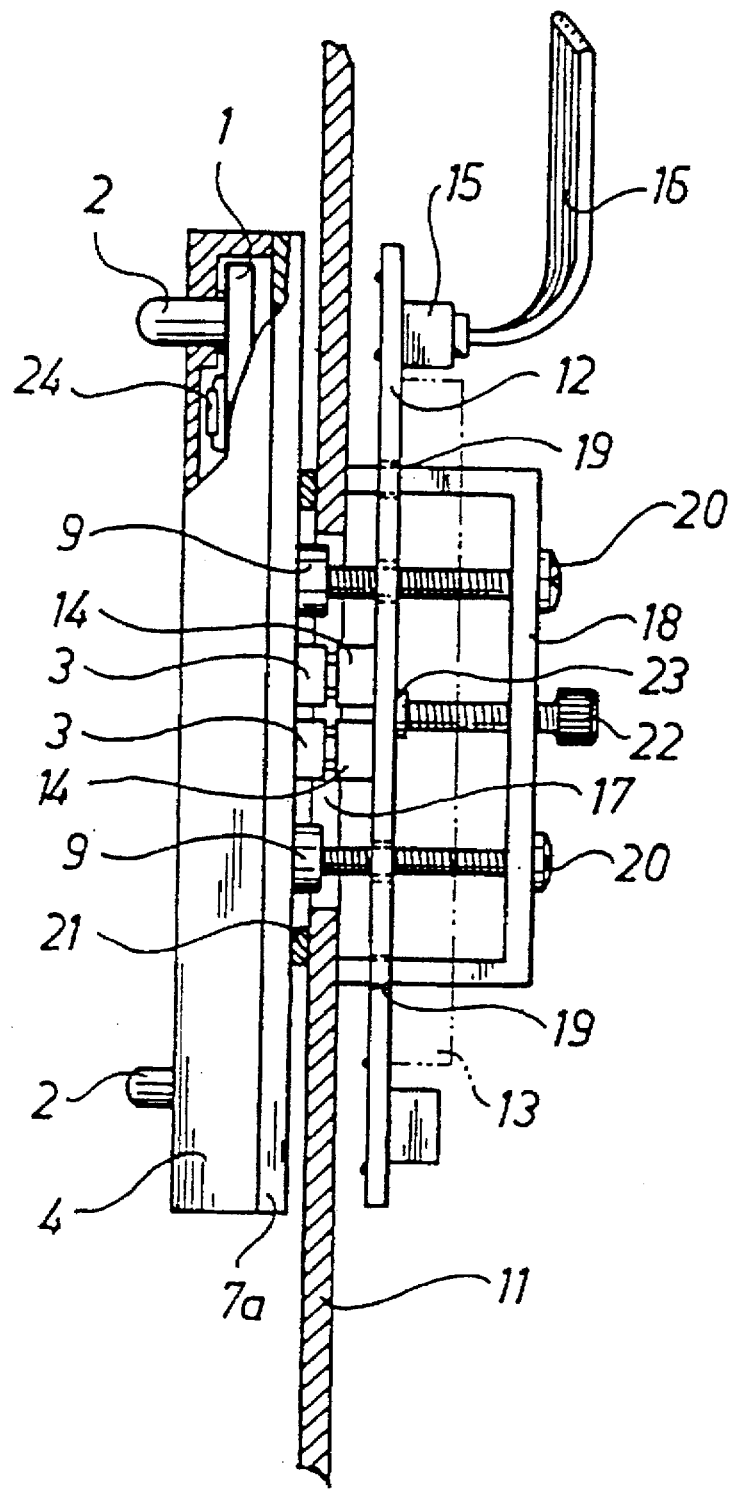
FIG. 2 is a horizontal sectional view through a wall of a cover box in which wall the signal indicating device is mounted.
Figure 3:
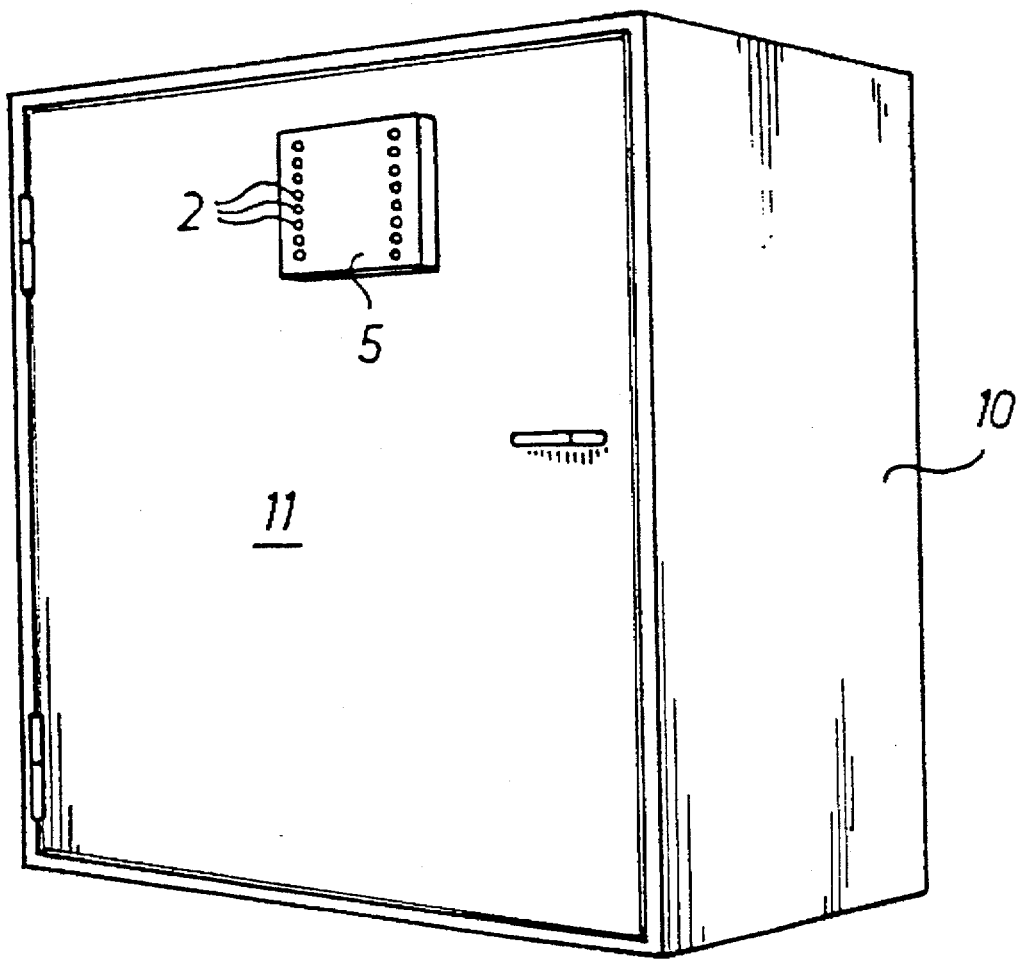
FIG. 3 is a perspective view of a cover box having the signal indicating device mounted thereon.

FIG. 2 illustrates the thus assembled signal indicating device when mounted on the front wall 11 of a cover box 10, the front wall in this case being formed by the box door. A printed circuit indicating or control card 12 is mounted on the inner face of the wall 11 and comprises various electrical means, such as timing circuits, galvanic separating components, etcetera which are merely indicated in the drawing figure by means of a dash-and-dot line 13. The printed circuit indicating or control card 12 is also formed with plugs 14 matching the plugs 3 of the printed circuit card 1, as well as with a plug 15 arranged to be connected to a ribbon cable 16 leading to a (not illustrated) module of e.g., contactors, relays, and the like.

To mount the signal indicating device in accordance with the invention on the cover box 10 the plugs 3 are interconnected with the plugs 14 via an opening 17 formed in the wall 11. A yoke 18 is then inserted through a pair of slits 19 formed in the card 12 so as to abut against the inner face of the wall 11. A couple of screws 20 are then passed through the yoke 18 and the card 12 and are screwed into the threaded sleeves 9. The screws 20 are tightened sufficiently hard to make the case 4 compress a seal 21 which surrounds the opening 17, against the outer face of the wall 11. In this manner the signal indicating device is held securely in position in abutment against the outer face of the wall 11. Finally, a further screw 22 is screwed through the yoke 18 and is tightened against a washer 23 of an insulating material abutting against the indicating card 12.

To assemble the signal indicating device in accordance with the invention in the manner described in the aforegoing could be done much quicker and a great deal cheaper than would be possible with any prior-art devices. In addition, the mounting of the signal indicating device on a cover box 10 is effected, in the manner described, with the aid of very simple means. At the same time, the resulting device is a sturdy unit, able to resist attacks from dirt as well as from moisture.

As a further development of the invention, the printed circuit card 1 preferably is provided with electrical components 24 serving to test the signalling lamps 2. This feature facilitates the mounting of the device in accordance with the invention still further as a result of the simplified wiring.

Figure 4:
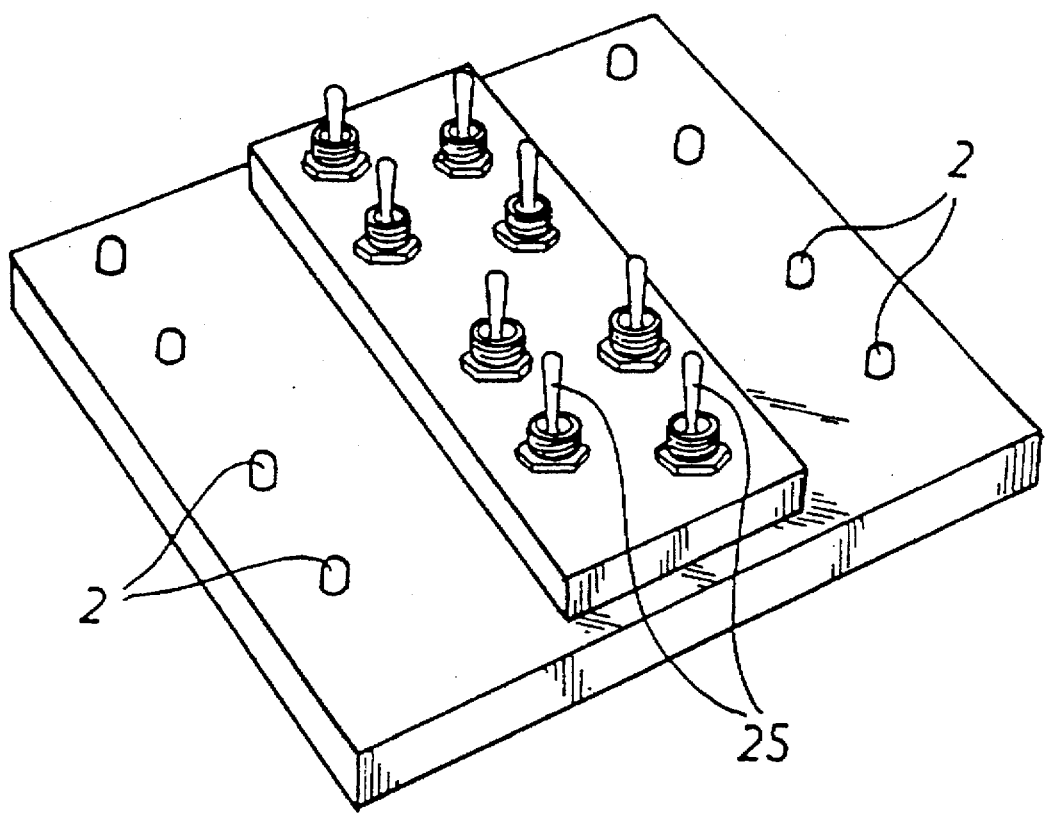
FIG. 4 is a perspective view of an alternative embodiment of the signal indicating device.

FIG. 4 shows a yet another further development of the invention. In this case, switches 25 are mounted on the printed circuit card for control function switch-over purposes. These switches 25 could be arranged to be reset from manual control in one end position via automatic control in an intermediate position to a close-off position and vice versa.

The signal indicating device in accordance with the invention forms a completely sealed factory-assembled module forming a self-contained unit. Consequently, the consumer need no longer, contrary to what has hitherto been necessary, make any arrangements of any kind to enclose or build in the device in order to provide complete moisture and pollution protection thereof.

The invention is not limited to the embodiments described and illustrated but could be varied in several ways within the scope of the appended claims. This is true as regards the number of indicator lamps as well as the types of such lamps. Electrical components having functions different from those mentioned here could be mounted on the printed circuit card 1.

I claim:

1. A signal-indicating electrical component box, comprising:

a cover box, including a wall and enclosing electrical components, as well as wiring connected with said components, and a printed circuit card, a signal-indicating device, said printed circuit card being connected to the signal-indicating device and arranged to transfer to said signal-indicating device information registered by said electrical components concerning operational conditions of an industrial process, said signal-indicating device comprising at least one row of signalling lamps mounted on said printed circuit card, said printed circuit card being hermetically enclosed in a case having a plurality of sides, said signalling lamps projecting through holes formed in one of said sides of said case said printed circuit card being formed with current paths between said signalling lamps and at least one plug mounted on said printed circuit card, each said plug projecting through and out of one side of said case and each being connected with a respective corresponding plug on said printed circuit card via an opening formed in said wall of the cover box, said case being arranged to exert a compressing force on a sealing gasket mounted around said opening in said wall.

2. A signal indicating device as claimed in claim 1, wherein:

said printed circuit card is provided with electrical components arranged to test said signalling lamps.

3. A signal indicating device as claimed in claim 1 further including:

switches mounted on said printed circuit card and arranged to reset control functions from automatic control to manual control and vice versa.

4. A signal indicating device as claimed in claim 2, further including:

switches mounted on said printed circuit card and arranged to reset control functions from automatic control to manual control and vice versa.

* * * * *